(12) United States Patent
Varale et al.

(10) Patent No.: US 10,707,665 B2
(45) Date of Patent: Jul. 7, 2020

(54) PERFECTED DEVICE FOR THE WALL-FIXING OF ELONGATED BODIES, IN PARTICULAR RADIATING COAXIAL CABLES

(71) Applicant: FI.MO.TEC. S.P.A., Cologno Monzese (IT)

(72) Inventors: Alberto Varale, Cologno Monzese (IT); Massimo Bottazzoli, Cologno Monzese (IT)

( * ) Notice: Subject to any disclaimer, the term of this patent is extended or adjusted under 35 U.S.C. 154(b) by 0 days.

(21) Appl. No.: 15/536,161

(22) PCT Filed: Dec. 15, 2015

(86) PCT No.: PCT/EP2015/002603
§ 371 (c)(1),
(2) Date: Jun. 15, 2017

(87) PCT Pub. No.: WO2016/096149
PCT Pub. Date: Jun. 23, 2016

(65) Prior Publication Data
US 2017/0353024 A1 Dec. 7, 2017

(30) Foreign Application Priority Data

Dec. 2, 2014 (IT) .......................... MI2014A002181
Dec. 2, 2015 (IT) ....................... 102015000079097

(51) Int. Cl.
*H02G 3/32* (2006.01)
*F16L 3/13* (2006.01)
(Continued)

(52) U.S. Cl.
CPC ............... *H02G 3/32* (2013.01); *F16L 3/127* (2013.01); *F16L 3/13* (2013.01); *H01Q 1/1221* (2013.01);
(Continued)

(58) Field of Classification Search
CPC ..... F16L 3/127; F16L 3/24; F16L 3/13; F16L 3/133; F16L 3/12; F16L 3/223;
(Continued)

(56) References Cited

U.S. PATENT DOCUMENTS 1,813,417 A * 7/1931 Noble ..................... H01R 4/60
439/208
1,991,075 A * 2/1935 Bloomquist ........... H01R 11/15
403/191
(Continued)

FOREIGN PATENT DOCUMENTS

CA       1172231      8/1984
CA       2618941      7/2009
(Continued)

*Primary Examiner* — Hiwot E Tefera
*Assistant Examiner* — Taylor L Morris
(74) *Attorney, Agent, or Firm* — Themis Law

(57) ABSTRACT

A device for the wall-fixing of elongated bodies, in particular radiating coaxial cables, of the type equipped with a spacer provided with a cable clamp equipped with a lid for supporting an elongated body in a suspended position onto a wall. The spacer of the device has a structure composed of two arms, whose end facing the wall is provided with a corresponding base, whereas the opposite end of the arms carries a base for fixing to the cable clamp. With respect to the known wall-fixing devices of radiating coaxial cables, that according to the invention offers the advantage of having an improved resistance to flexural and torsional stress, also preventing interferences with the metallic part of the wall-fixing system.

7 Claims, 10 Drawing Sheets

(51) Int. Cl.
*F16L 3/127* (2006.01)
*H02G 3/00* (2006.01)
*H01Q 1/12* (2006.01)
*H02G 3/30* (2006.01)
*F16L 3/133* (2006.01)
*F16M 13/02* (2006.01)
*F16L 3/223* (2006.01)
*F16L 3/22* (2006.01)

(52) U.S. Cl.
CPC ............... *H02G 3/26* (2013.01); *H02G 3/30* (2013.01); *F16L 3/133* (2013.01); *F16L 3/22* (2013.01); *F16L 3/2235* (2013.01); *F16M 13/02* (2013.01); *H02G 3/263* (2013.01)

(58) Field of Classification Search
CPC . F16L 55/035; F16L 3/227; F16L 3/22; F16L 3/2235; H02G 3/32; H02G 3/30; H02G 3/263; H02G 3/26; H02G 7/08; H01Q 1/1221; F16M 13/02
USPC ...... 248/58, 62, 65, 68.1, 71, 73, 74.1, 74.2, 248/74.3; 439/208; 174/78
See application file for complete search history.

(56) References Cited

U.S. PATENT DOCUMENTS

| | | | | | |
|---|---|---|---|---|---|
| 2,340,713 | A * | 2/1944 | Tinnerman | ............ | F16L 3/1233 174/40 CC |
| 2,636,703 | A * | 4/1953 | Wallans | ............ | F16L 3/14 248/58 |
| 3,270,992 | A * | 9/1966 | Cassel | ............ | F01N 13/1822 180/311 |
| 3,317,167 | A * | 5/1967 | Becker | ............ | F16L 3/13 248/73 |
| 3,414,219 | A * | 12/1968 | Siegel | ............ | F16L 3/1091 248/207 |
| 3,499,973 | A * | 3/1970 | Barnes | ............ | H02G 7/20 174/149 R |
| 3,512,654 | A * | 5/1970 | Jay | ............ | A47B 57/485 211/193 |
| 3,528,634 | A * | 9/1970 | Jenkins | ............ | F16L 3/16 248/70 |
| 3,540,687 | A * | 11/1970 | Cuva | ............ | F21V 19/0005 248/223.41 |
| 3,568,964 | A * | 3/1971 | Perkins | ............ | F16L 3/12 174/156 |
| 3,632,071 | A * | 1/1972 | Cameron | ............ | F16L 3/08 24/16 PB |
| 3,669,395 | A * | 6/1972 | Gehrke | ............ | A47F 5/08 108/29 |
| 3,844,515 | A * | 10/1974 | Knol | ............ | F22B 37/20 122/510 |
| 3,884,438 | A * | 5/1975 | Logsdon | ............ | F16L 3/00 248/230.7 |
| 3,923,277 | A * | 12/1975 | Perrault | ............ | F16L 3/00 211/196 |
| 4,013,253 | A * | 3/1977 | Perrault | ............ | A47B 96/061 248/222.51 |
| 4,042,198 | A * | 8/1977 | Takeuchi | ............ | E21F 17/02 248/62 |
| 4,061,299 | A * | 12/1977 | Kurosaki | ............ | F16L 3/10 248/73 |
| 4,270,250 | A * | 6/1981 | Schon | ............ | F16L 3/1091 24/114.5 |
| 4,306,697 | A * | 12/1981 | Mathews | ............ | F16L 3/222 248/68.1 |
| 4,371,137 | A * | 2/1983 | Anscher | ............ | F16L 3/23 24/16 PB |
| 4,479,625 | A * | 10/1984 | Martz | ............ | F16L 3/127 248/62 |
| 4,618,114 | A * | 10/1986 | McFarland | ............ | F16L 3/13 248/220.21 |
| 4,671,419 | A * | 6/1987 | Beverly | ............ | A47H 1/142 211/105.1 |
| 4,790,060 | A * | 12/1988 | Council | ............ | F16L 3/12 248/68.1 |
| 4,865,280 | A * | 9/1989 | Wollar | ............ | F16L 3/23 248/68.1 |
| 4,991,801 | A * | 2/1991 | Trumbull | ............ | F16L 3/13 248/62 |
| 5,058,838 | A * | 10/1991 | Velke, Sr. | ............ | F21V 19/009 174/138 H |
| 5,060,891 | A * | 10/1991 | Nagy | ............ | F16L 3/127 174/659 |
| 5,092,547 | A * | 3/1992 | Richards | ............ | F16L 3/133 248/62 |
| 5,281,761 | A * | 1/1994 | Woo | ............ | H01R 4/643 174/78 |
| 5,303,886 | A * | 4/1994 | DeFazio | ............ | F16L 3/24 248/62 |
| 5,385,320 | A * | 1/1995 | Ismert | ............ | F16L 3/10 248/62 |
| 5,470,249 | A * | 11/1995 | Manganello | ............ | H01R 13/6392 439/368 |
| 5,547,152 | A * | 8/1996 | Krock | ............ | F16L 3/1008 248/74.1 |
| 5,560,162 | A * | 10/1996 | Kemeny | ............ | E04H 9/02 52/167.3 |
| 5,582,303 | A * | 12/1996 | Sloan | ............ | A47G 25/0692 211/105.1 |
| 5,586,738 | A * | 12/1996 | Binelli | ............ | F16L 3/1008 24/20 TT |
| 5,613,655 | A * | 3/1997 | Marion | ............ | F16L 3/2235 24/339 |
| 5,616,036 | A * | 4/1997 | Polidori | ............ | H01R 4/60 248/74.1 |
| 5,647,490 | A * | 7/1997 | Hull | ............ | A47B 61/003 108/29 |
| 5,758,851 | A * | 6/1998 | Remmers | ............ | A47B 61/003 211/105.1 |
| 5,785,285 | A * | 7/1998 | Gordon | ............ | F16L 3/13 248/68.1 |
| 5,794,897 | A * | 8/1998 | Jobin | ............ | H02G 7/053 24/459 |
| 5,876,000 | A * | 3/1999 | Ismert | ............ | E03C 1/021 248/65 |
| 5,937,073 | A * | 8/1999 | Van Gieson | ............ | H04R 1/026 181/150 |
| 5,941,483 | A * | 8/1999 | Baginski | ............ | F16L 3/22 248/68.1 |
| 6,053,465 | A * | 4/2000 | Kluge | ............ | A47B 61/003 248/201 |
| 6,065,730 | A * | 5/2000 | Marks | ............ | E04G 21/185 248/314 |
| 6,135,397 | A * | 10/2000 | Santa Cruz | ............ | F16L 3/14 248/302 |
| 6,138,960 | A * | 10/2000 | Carbonare | ............ | F16L 3/1083 248/62 |
| 6,206,331 | B1* | 3/2001 | Keith | ............ | B60R 16/0215 248/73 |
| 6,227,502 | B1* | 5/2001 | Derman | ............ | F16L 3/2235 248/68.1 |
| 6,234,277 | B1* | 5/2001 | Kaczmarek | ............ | B66B 7/06 174/42 |
| 6,244,545 | B1* | 6/2001 | McCrary | ............ | F16L 3/00 248/220.21 |
| 6,245,998 | B1* | 6/2001 | Curry | ............ | H02B 1/202 174/72 A |
| 6,396,992 | B1* | 5/2002 | Debal | ............ | H04Q 1/13 385/135 |
| 6,460,813 | B1* | 10/2002 | Gretz | ............ | F16L 3/1025 248/62 |
| 6,568,645 | B2* | 5/2003 | Maddox | ............ | F16K 37/00 248/207 |
| 6,578,498 | B1* | 6/2003 | Draudt | ............ | A47B 21/06 108/108 |

(56) References Cited

U.S. PATENT DOCUMENTS

| | | | | |
|---|---|---|---|---|
| 6,648,278 | B1* | 11/2003 | Kirschner | F16L 3/02 248/58 |
| 6,702,236 | B1* | 3/2004 | Kirschner | H02G 7/20 248/300 |
| 6,818,834 | B1* | 11/2004 | Lin | H02G 3/32 174/135 |
| 6,828,504 | B1* | 12/2004 | Schmidt | H01R 4/66 174/75 C |
| 7,025,309 | B2* | 4/2006 | Goodwin | F16L 3/1233 248/62 |
| 7,071,418 | B2* | 7/2006 | Brockman | H02G 3/32 174/154 |
| 7,172,162 | B2* | 2/2007 | Mizukoshi | B60H 1/00557 248/49 |
| 7,201,282 | B1* | 4/2007 | Alderman | A47B 81/00 211/100 |
| 7,331,549 | B2* | 2/2008 | Wirth, Jr. | F16L 3/10 248/65 |
| 7,429,020 | B2* | 9/2008 | Huebner | F16L 3/133 24/16 PB |
| 7,455,268 | B2* | 11/2008 | Heath | F16L 3/1215 248/65 |
| 7,497,718 | B2* | 3/2009 | Nix | F16L 3/1033 439/347 |
| 7,540,455 | B2* | 6/2009 | Wunderlich | F16L 3/22 174/135 |
| 7,540,758 | B2* | 6/2009 | Ho | H01R 4/2408 174/78 |
| 7,744,042 | B2* | 6/2010 | Heath | F16L 3/127 248/58 |
| 7,748,677 | B2* | 7/2010 | Neckel | F16M 13/02 248/302 |
| 7,793,893 | B2* | 9/2010 | Opperthauser | F16L 59/135 248/55 |
| 7,896,296 | B2* | 3/2011 | Julian | F16L 3/127 248/547 |
| 7,905,454 | B2* | 3/2011 | Sanatgar | F28F 9/013 248/300 |
| 7,931,242 | B2* | 4/2011 | Tjerrild | F16L 3/227 248/317 |
| 7,938,671 | B2* | 5/2011 | Hayden, Sr. | H01R 13/6395 439/371 |
| 8,011,621 | B2* | 9/2011 | Korczak | F16L 3/127 248/231.81 |
| 8,093,499 | B2* | 1/2012 | Hoffer | H02G 3/0456 174/68.1 |
| 8,376,289 | B2* | 2/2013 | Heath | F16L 3/127 248/58 |
| 8,378,233 | B2* | 2/2013 | Clymer | H02G 3/22 174/481 |
| 8,500,078 | B2* | 8/2013 | Castellanos | A47B 96/06 211/87.01 |
| 8,529,285 | B1* | 9/2013 | Sievers | H01R 13/6395 439/373 |
| 8,550,411 | B2* | 10/2013 | Hiss | H02G 3/32 248/230.5 |
| 8,870,132 | B2* | 10/2014 | Sampson | F16L 3/123 248/62 |
| 8,894,023 | B2* | 11/2014 | Dann | F16L 3/24 248/58 |
| 2002/0003195 | A1* | 1/2002 | McDowell | A01K 3/005 248/71 |
| 2002/0084388 | A1* | 7/2002 | Geiger | F16L 3/233 248/74.3 |
| 2005/0011996 | A1 | 1/2005 | Geater | |
| 2005/0103961 | A1* | 5/2005 | Swanstrom | F16L 3/13 248/305 |
| 2005/0279892 | A1* | 12/2005 | Kovac | F16L 3/127 248/65 |
| 2006/0024127 | A1* | 2/2006 | Heath | F16L 3/133 403/150 |
| 2007/0215757 | A1* | 9/2007 | Yuta | F16L 55/035 248/68.1 |
| 2008/0129040 | A1* | 6/2008 | Heath | F16L 3/13 285/24 |
| 2009/0065659 | A1* | 3/2009 | Dann | F16L 3/127 248/74.1 |
| 2009/0114776 | A1* | 5/2009 | Julian | F16L 3/127 248/65 |
| 2009/0173844 | A1* | 7/2009 | Huo | H02G 3/32 248/65 |
| 2009/0294601 | A1* | 12/2009 | Pedersen | F16L 3/13 248/74.1 |
| 2010/0193651 | A1* | 8/2010 | Railsback | F16L 3/2235 248/229.24 |
| 2010/0215330 | A1* | 8/2010 | Sokolowski | G02B 6/4471 385/136 |
| 2011/0024230 | A1* | 2/2011 | Mahr | A62B 1/04 182/36 |
| 2011/0062292 | A1* | 3/2011 | McCoy | F16L 3/223 248/68.1 |
| 2012/0132761 | A1* | 5/2012 | Elsmore | F16L 3/1075 248/74.1 |
| 2012/0217355 | A1* | 8/2012 | Geiger | F16L 3/12 248/74.2 |
| 2012/0217371 | A1* | 8/2012 | Abdollahzadeh | E05B 15/1607 248/551 |
| 2013/0015301 | A1* | 1/2013 | Zvak | F16L 3/123 248/74.1 |
| 2013/0047385 | A1* | 2/2013 | Healy | B64C 1/406 24/572.1 |
| 2013/0187001 | A1* | 7/2013 | Gensch | B64C 1/061 244/119 |
| 2013/0313375 | A1* | 11/2013 | Dworak, Jr. | F16L 3/1083 248/74.2 |
| 2015/0102180 | A1* | 4/2015 | Boland | F16L 3/1091 248/67.5 |
| 2016/0254656 | A1* | 9/2016 | Feige | H02G 3/32 248/61 |
| 2016/0327187 | A1* | 11/2016 | Brown | F16L 3/133 |
| 2018/0216587 | A1* | 8/2018 | Morimoto | F02M 55/02 |
| 2019/0323630 | A1* | 10/2019 | Doppelbauer | F16L 3/137 |

FOREIGN PATENT DOCUMENTS

| | | | |
|---|---|---|---|
| DE | 9212516 | 11/1992 | |
| EP | 0602548 | 6/1994 | |
| EP | 0722196 | 7/1996 | |
| EP | 1648068 | 4/2006 | |
| EP | 2889977 A1 * | 7/2015 | H02G 3/32 |

* cited by examiner

PERFECTED DEVICE FOR THE WALL-FIXING OF ELONGATED BODIES, IN PARTICULAR RADIATING COAXIAL CABLES

The present description relates to a perfected device for the wall-fixing of elongated bodies, in particular radiating coaxial cables.

The field of the invention is that of systems used for sustaining elongated bodies, such as, for example radiating coaxial cables.

Devices are known for this type of application, that fix the radiating coaxial cable, withheld by a specific cable clamp, to a wall, with the use of a spacer. A metallic screw, whose axis lies on the same plane that contains the axis of the cable, is then used for reciprocally making the cable clamp and spacer integral and also for fixing the latter to the wall with the help of an appropriate dowel or the like.

In this type of known application, drawbacks have been found, first of all due to the interferences on the signal emitted by the radiating cable, caused by the proximity of the latter to the metallic body of the screw.

A further disadvantage that has been found on the known devices of the above-mentioned type, is represented by the impossibility of installing the system on the wall, when the cable is already mounted in its seat on the cable clamp. In this condition, in fact, access to the fixing screw is prevented by the presence of the cable housed and operating in its seat.

In addition to the drawbacks indicated above, there is also the disadvantage that, when the system is installed on a ceiling, i.e. in a vertical position, the weight of the cable rests in the opening direction of the lid of the cable clamp. For this reason, the accidental opening of the cable clamp creates the risk that the cable itself can fall.

The publication CA 2 618 941 A1 discloses a rod for fixing canalizations in a suspended position, substantially composed of a metallic plate fixed to a wall by means of screws. This solution has the disadvantage of offering an extremely low resistance to deformations, in particular due to the pressure of the air displacements on the body of the rod, during the passage of trains in tunnels. The stability of the fixing of the plate in a suspended position, on the other hand, is jeopardized by the flexural stress which is also exerted on the screws.

Systems for fixing cables in a suspended position are also known from the publications U.S. 2005/011996 A1, DE 92 12 516 U1 and EP 0 722 196 A1.

The main objective of the present invention is to provide a new device for the wall-fixing of elongated bodies which, unlike the known devices of this type, offers an improved resistance to flexural and torsional stress, also preventing interferences with the metallic part of the wall-fixing system.

A further objective of the invention is to provide a device of the type indicated above, having an improved stiffening system in correspondence with the cable clamp device.

The invention also has the objective of making the fixing of the cable clamp device to the wall more stable and safe, envisaging a spacer suitable for resisting flexural stress.

Another objective of the invention is to provide a device, as described above, which is suitable for sustaining the cable also in the case of the accidental opening of the lid of the cable clamp.

These and other objectives are achieved with the device of claim 1. Preferred embodiments of the device of the invention are specified in the remaining claims.

With respect to the known wall-fixing devices of radiating coaxial cables, that according to the invention offers the advantage of having an improved resistance to flexural and torsional stress, also preventing interferences with the metallic part of the wall-fixing system.

The device of the invention is, in particular, provided with stiffenings, capable of opposing flexural and torsional stress, leaving the function of fixing the cable clamp to the wall to a single screw.

A further advantage of the invention is that, with the device assembled on the wall either vertically or horizontally, the weight of the cable is never exerted on the safety lid.

These and other objectives, advantages and characteristics appear evident from the following description of the invention which is illustrated, as a non-limiting example, in the figures of the enclosed drawings, in which.

Figure 1:
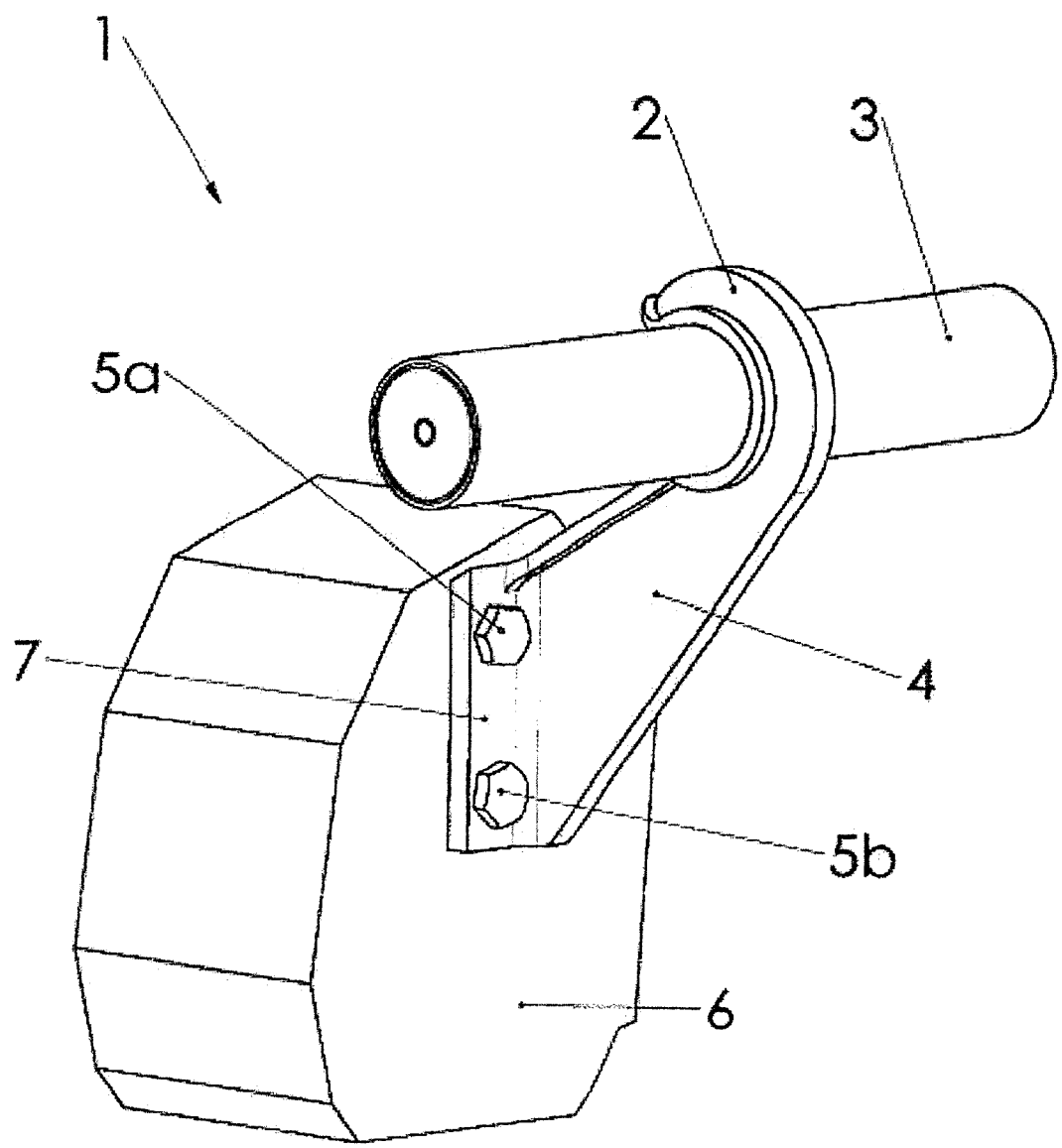
FIG. 1 represents a device of the known art for the wall-fixing of canalizations.

The device according to the known art for the wall-fixing 6 of elongated bodies 3 in a suspended position is indicated as a whole with 1 in FIG. 1. This device substantially consists of a shaped plate 4 acting as spacer which, at the end facing the wall 6, is provided with a base 7 attached to the same wall 6 by means of screws 5a,5b. On its opposite side, the plate 4 has a cable clamp hook 2, in which the elongated body 3 is housed, so as to hold it on the wall 6 in a suspended position.

The system of FIG. 1 has the disadvantage that the plate 4 for fixing the elongated body 3 does not offer an adequate resistance to flexural and torsional stress, due, for example, to the impact of air generated by the passage of a train in a tunnel. The known system, moreover, delegates to the screws 5a and 5b not only the function of fixing the plate 4 to the wall 6, but also that of opposing the flexural stress, against which the ribbon-like structure of the plate 4 is not, in fact, able to oppose.

Figure 3:
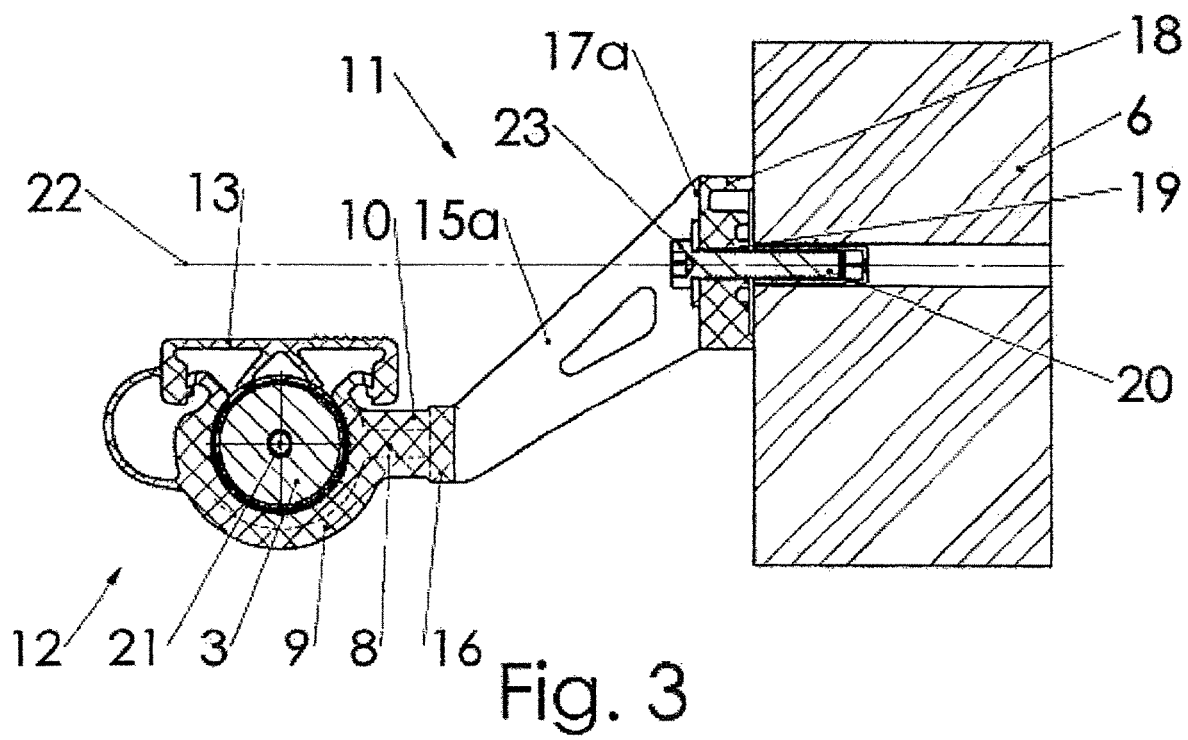
FIG. 3 illustrates the device of FIG. 2 in a section A-A.
Figure 2:
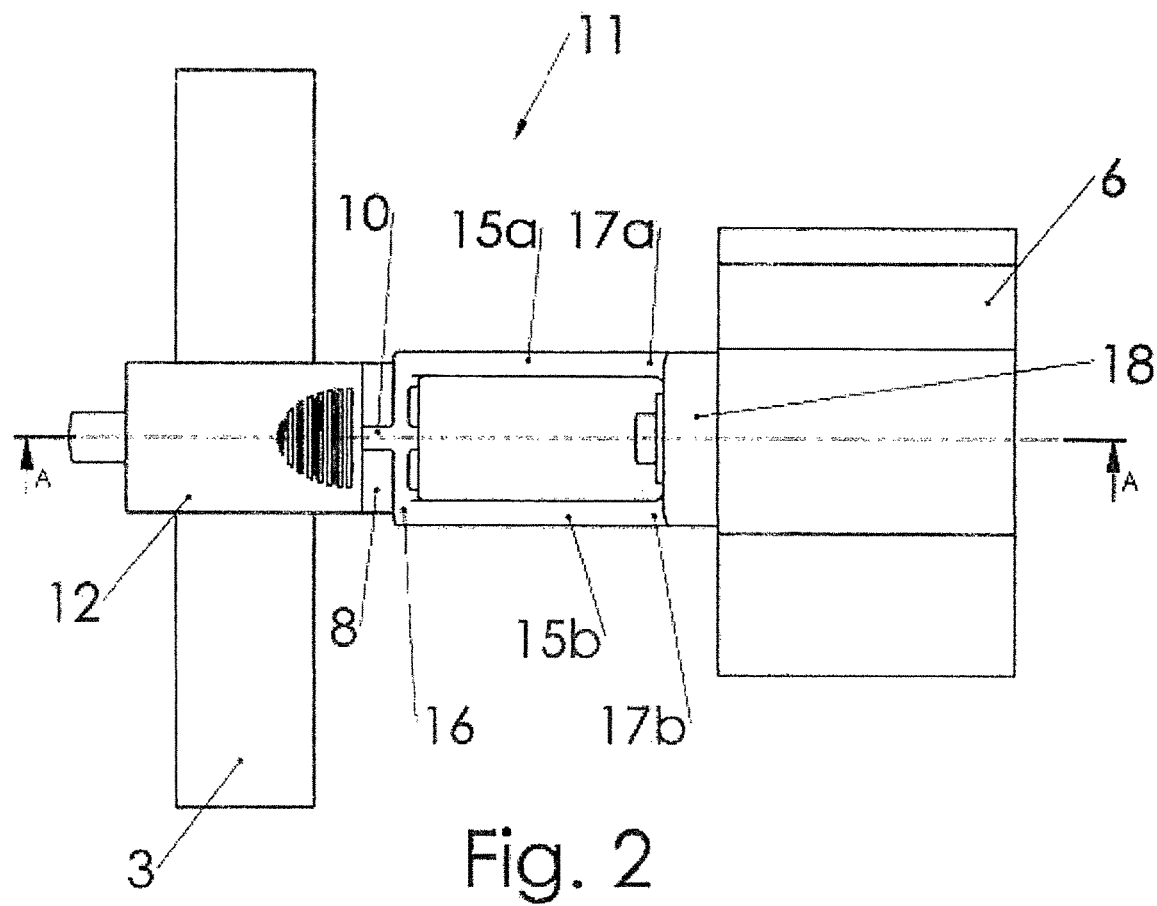
FIG. 2 illustrates a plan view of the device of the invention, as used for the wall-fixing of a radiating cable in a suspended position.
Figure 5:
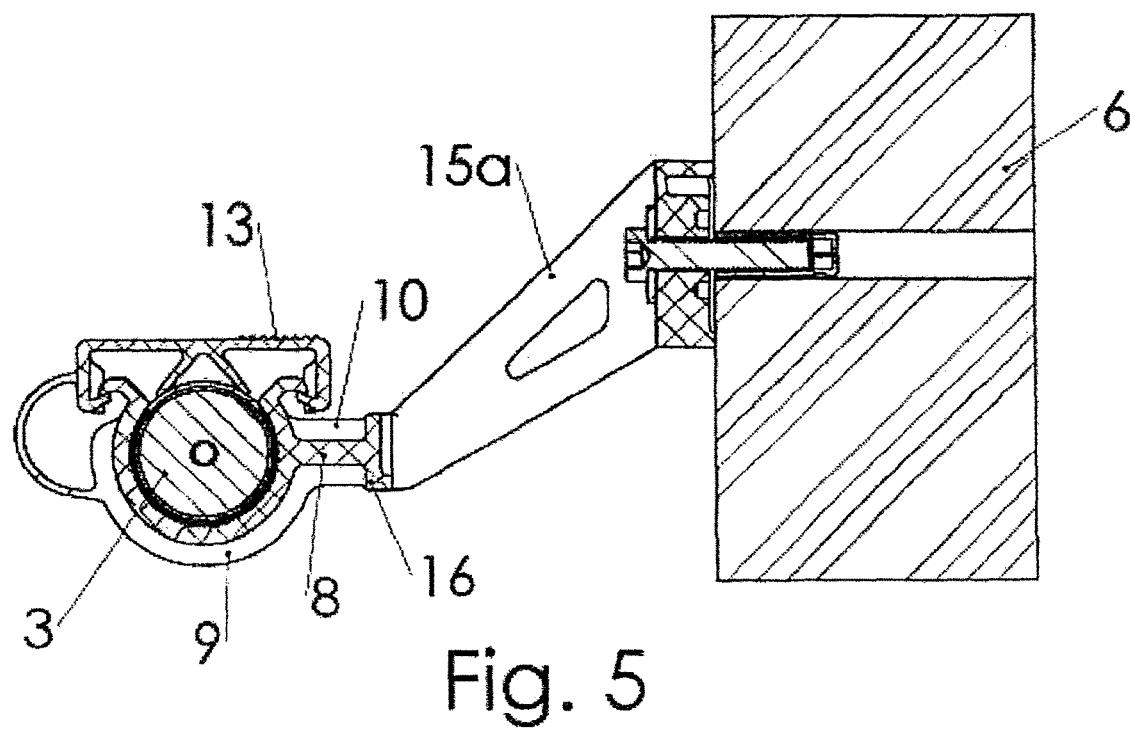
FIG. 4 illustrates a plan view of the device of the invention and FIG. 5 illustrates the device of FIG. 4 in a section B-B.
Figure 4:
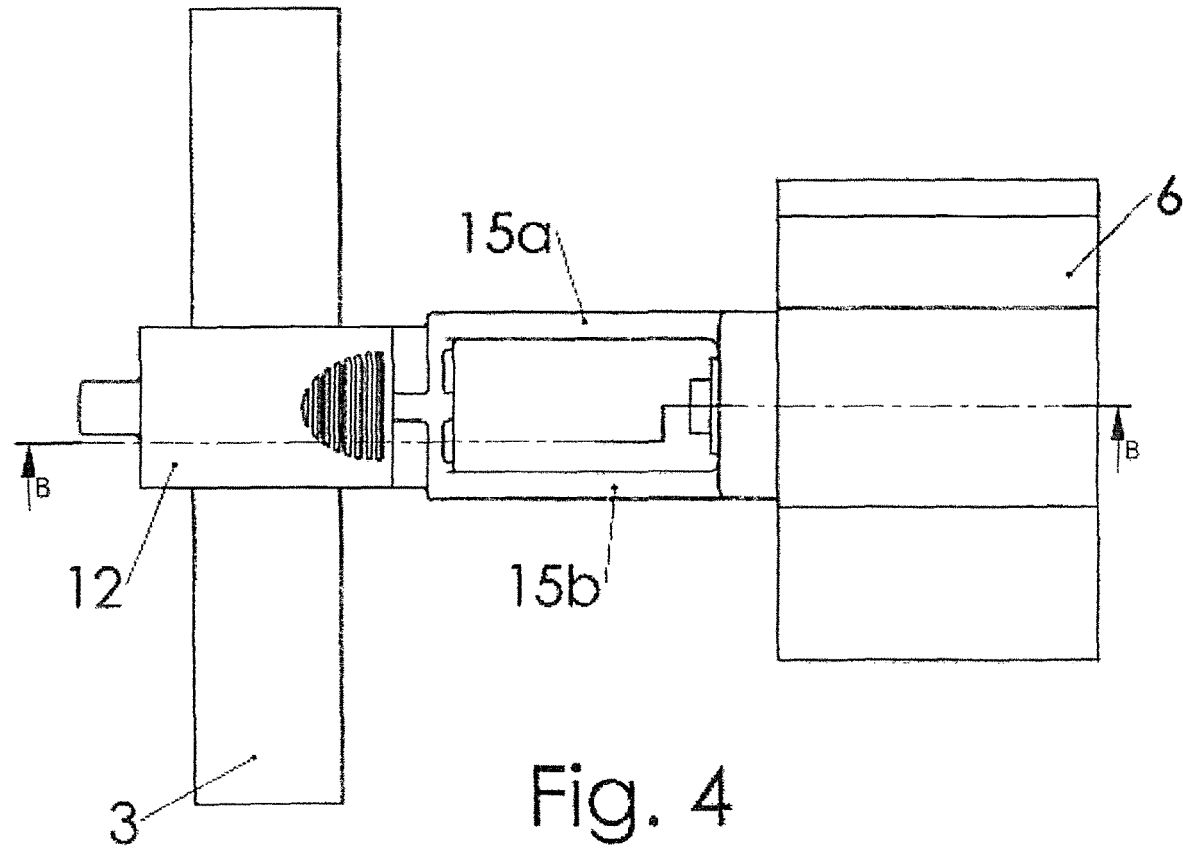
Figure 7:
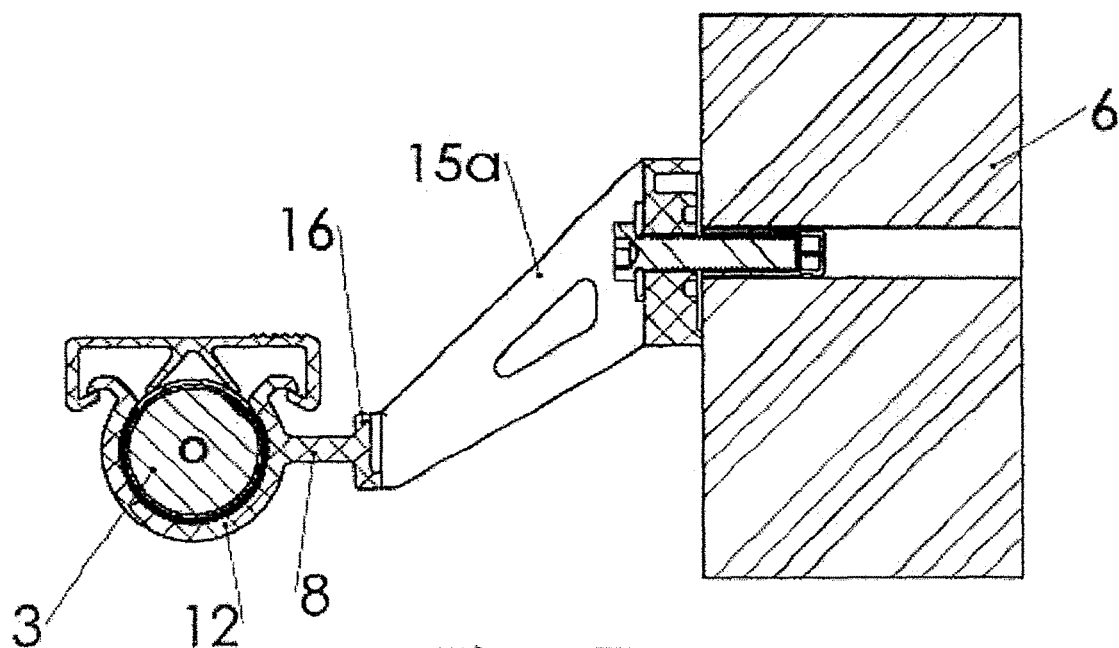
FIG. 7 illustrates the device of FIG. 6 in a section C-C.
Figure 6:
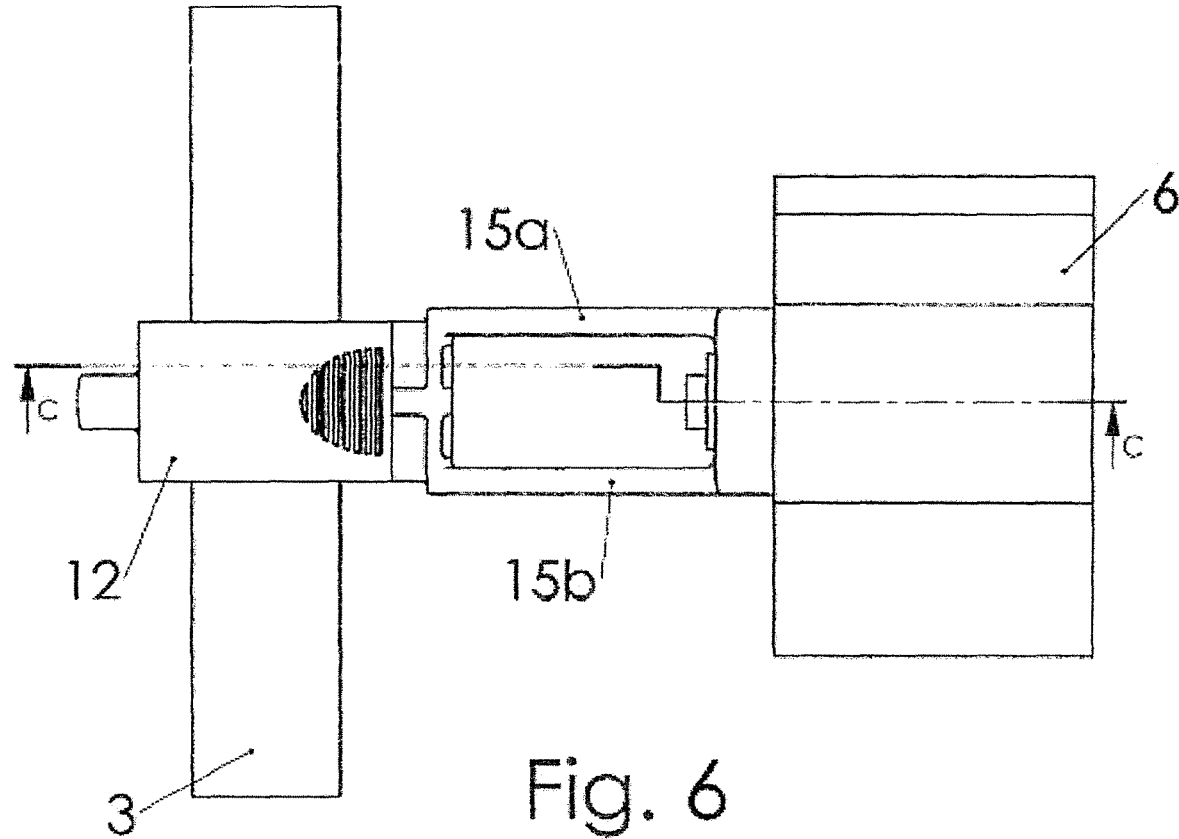
FIG. 6 illustrates a plan view of the device of the invention.

In order to overcome these drawbacks, the device of the invention has been conceived, provided with the device, which is indicated as a whole with 11 in FIGS. 2 and 3 and which is suitable for withholding a coaxial cable 3 in a suspended position on a vertical wall 6. As can also be seen in FIG. 8, the device of the invention has a substantially lattice-like structure, distinguished by the presence of two arms 15a and 15b acting as spacer, whose end 17a,17b facing the wall 6 is provided with a corresponding base 18. The latter in turn has a seat 19 which houses the fixing screw 20 of the device 11 to the wall 6.

Figure 8:
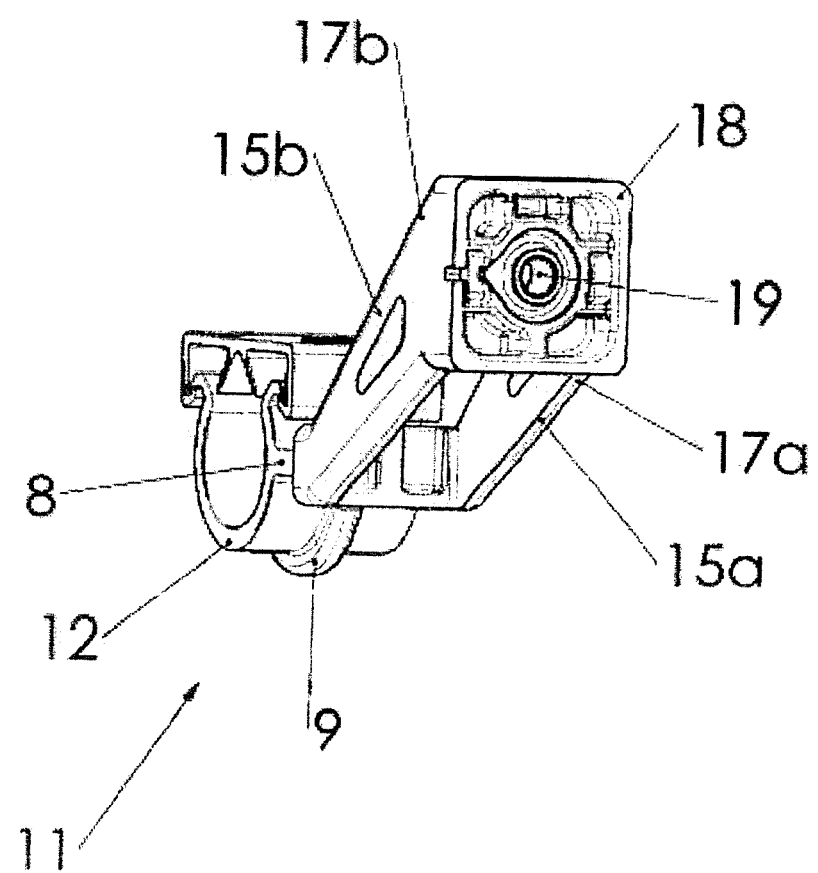
FIG. 8 illustrates a perspective view of the device of the invention.

As can be better seen in FIG. 8, said seat 19 is situated on the base 18 between the arms 15a and 15b, preferably in an intermediate position with respect to the distance that separates the respective ends 17a and 17b. These sides 15a, 15b preferably have a flattened form, provided with an opening 28a, 28b (FIG. 12) and tapered in the direction of the cable clamp 12, to which they are joined by means of a corresponding base 16. As can be seen in particular in FIGS. 2 to 7, the above-mentioned base 16 is joined to the body of the cable clamp 12 by means of a plate 8 which has, on the side opposite to the lid 13 of the cable clamp, a stiffening rib 9 which extends along the corresponding arc portion of the same cable clamp 12 and, on the side opposite to this, a rib 10.

Figure 9:
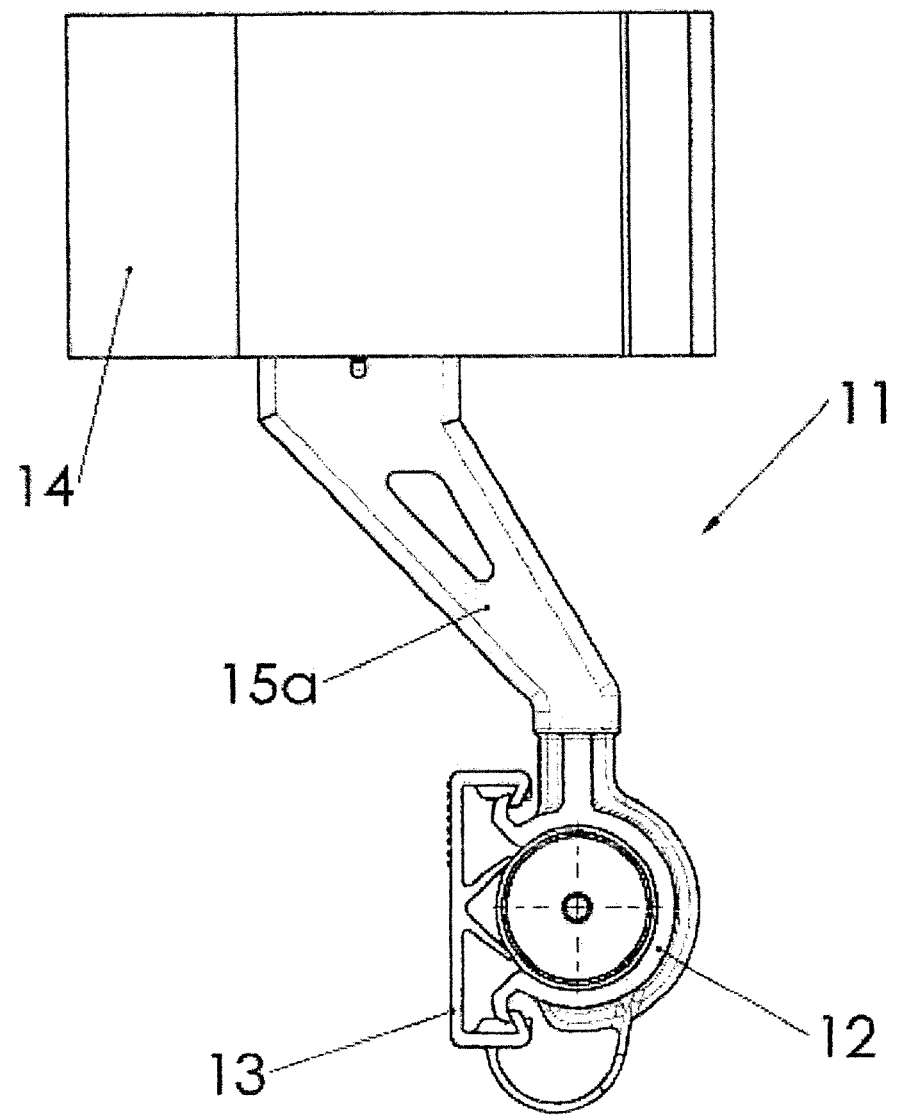
FIG. 9 illustrates the device of FIG. 8, as applied on a horizontal wall.
Figure 10:
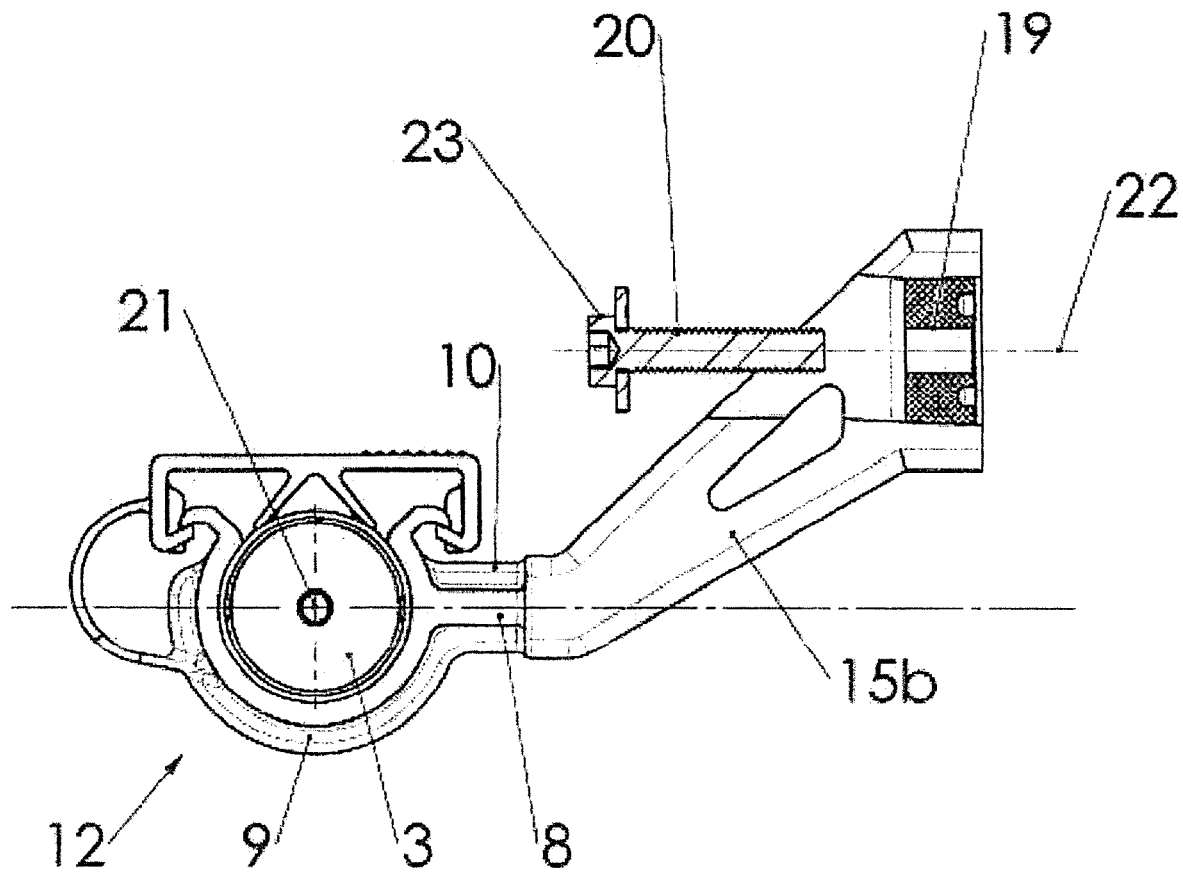
FIG. 10 illustrates the device of FIG. 3 in the installation phase on the wall.

When the above-mentioned lid 13 of the cable clamp 12 is arranged in its closed position, it is situated above the cable 3 if the device 11 is installed on a vertical wall 6 (FIG. 3), whereas it is positioned to the side of the same cable 3 when the device 11 is installed on a horizontal wall 14, the latter being in a position perpendicular to the closing surface of the same lid 13 (FIG. 9). In this way, the weight of the cable 3 is never exerted on the lid 13, preventing its accidental opening.

As can be seen from the illustrations previously indicated, the arms 15a,15b of the device of the invention have a tilted orientation with respect to the axis 22 of the seat 19 for the wall-fixing screw 20 of the same device 11. Furthermore, thanks to the described tilted arrangement of the above-mentioned arms 15a and 15b, the axis 22 of the above-mentioned seat 19 is in a separate and distant position from the longitudinal axis 21 of the cable clamp 12, avoiding interferences of the signal emitted by the cable 3 with the metallic head 23 of the screw 20 used for fixing the device of the invention to the wall.

As is known, cable clamps for radiating cables are made of plastic material, in order to avoid interferences on the signal emitted by the above-mentioned radiating cable. In order to prevent the heat produced by a possible fire from causing the cable to fall due to the destruction of the material of the cable clamp, a metallic cable clamp is inserted for example every ten cable clamps made of plastic.

Figure 11:
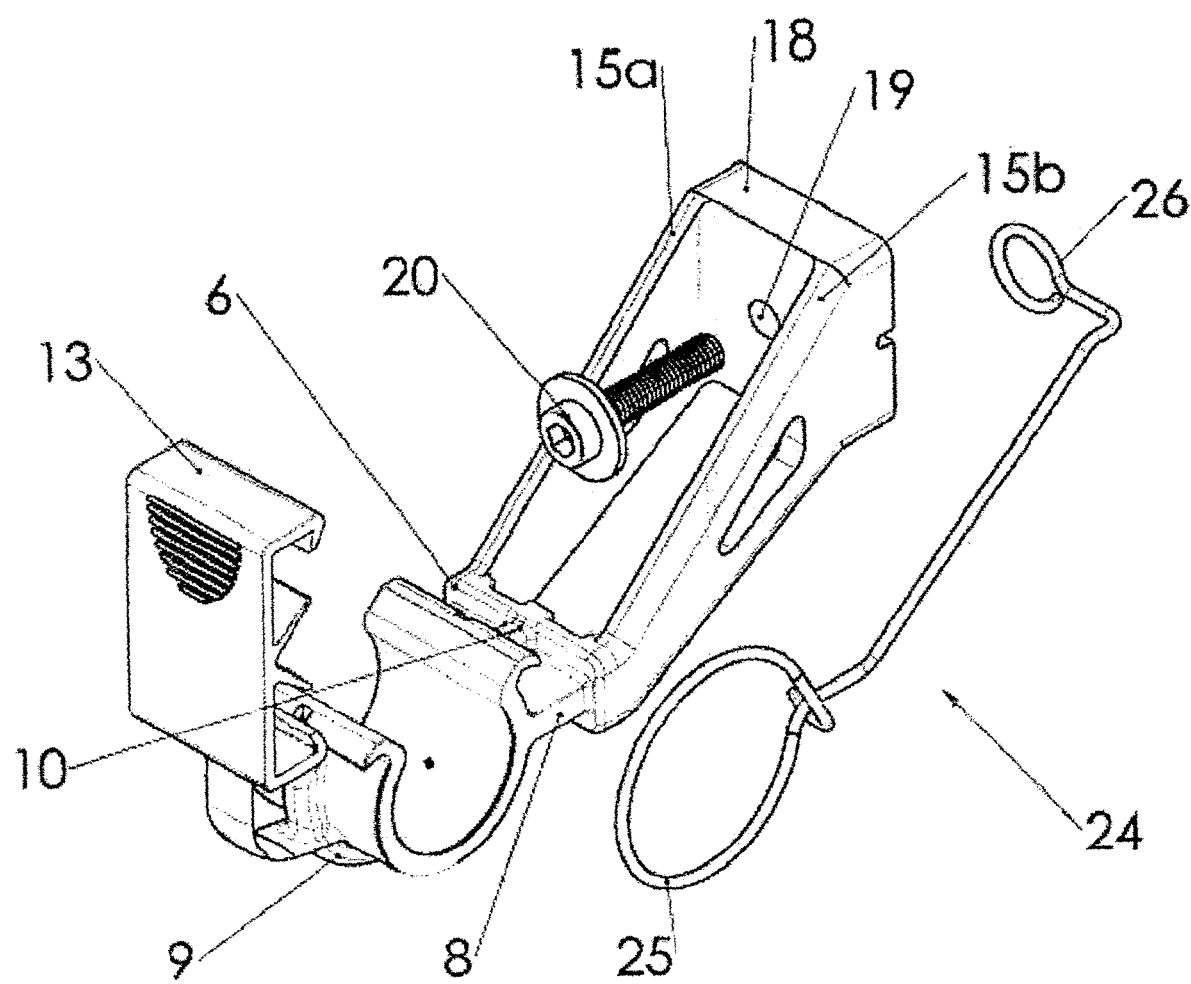
FIGS. 11 to 13 represent a preferred embodiment of the invention, with a safety system for sustaining coaxial cables.
Figure 12:
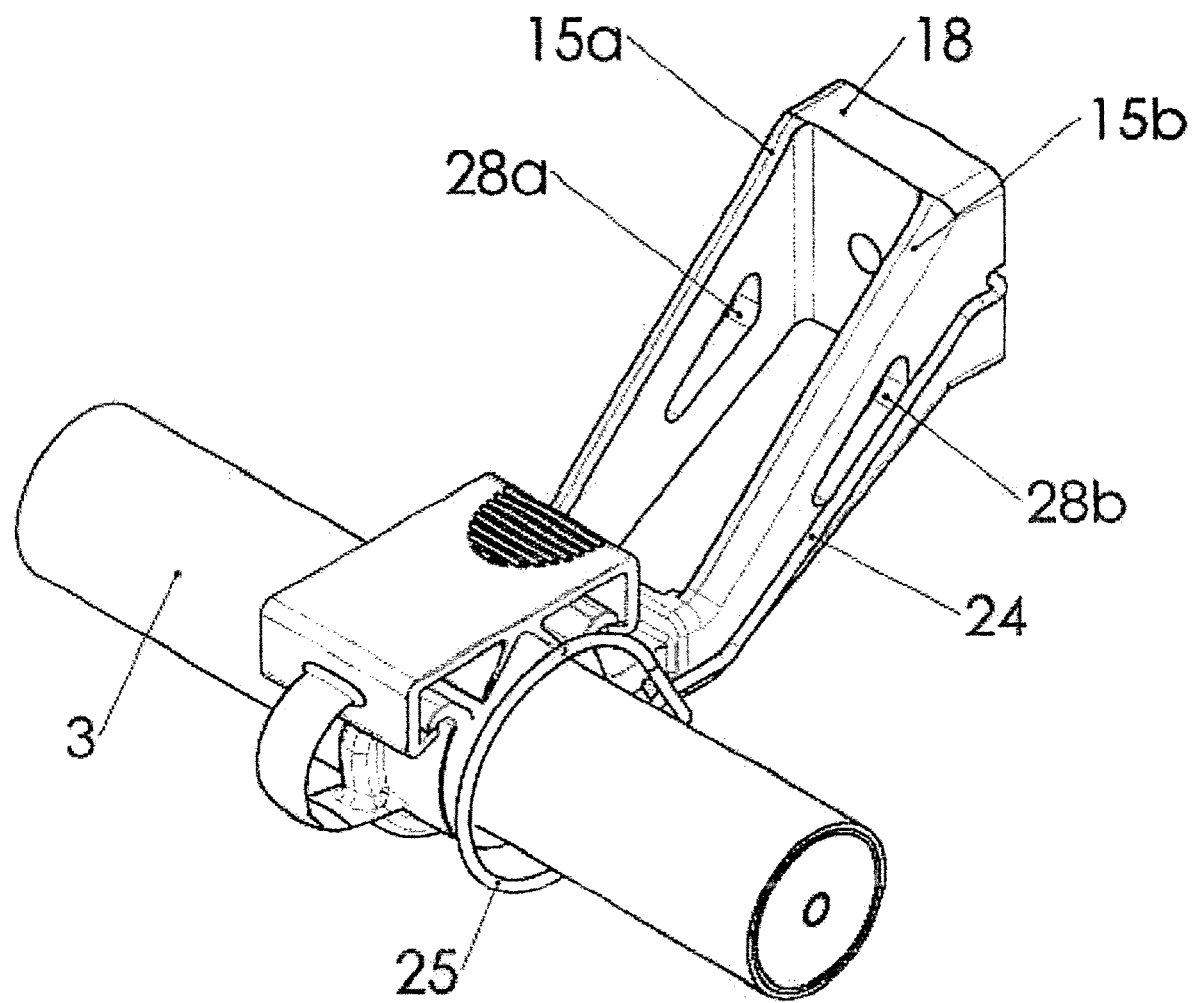
Figure 13:
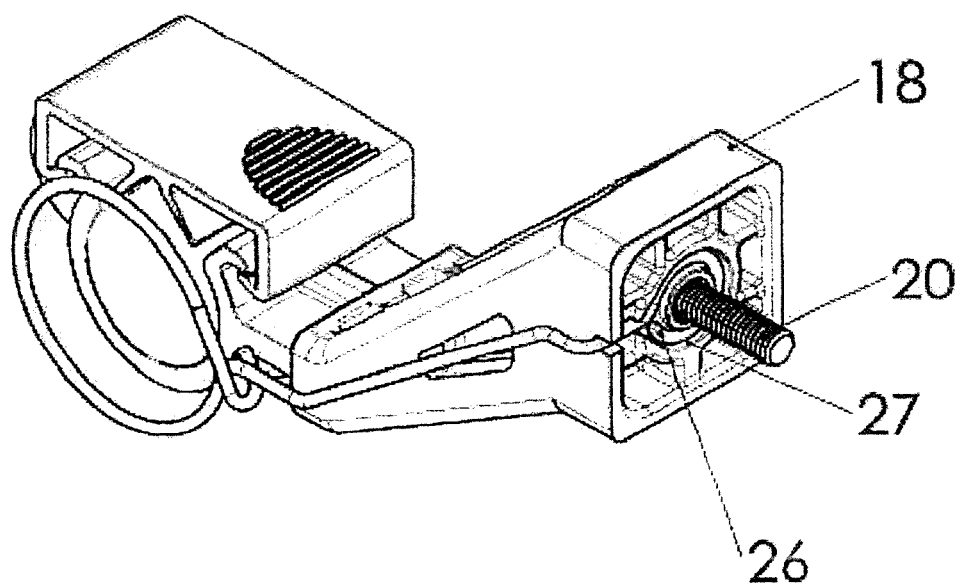

In the device of the invention, better illustrated in FIGS. 11 to 13, a safety fixing system of the cable 3 is envisaged, consisting of a flexible metallic wire 24, provided, at one end, with an openable collar 25 that closes around the cable 3 and, at the opposite end, with a fixing ring 26 inside an appropriate seat 27 formed on the rear part of the base plate 18 to the wall. The consolidation of the fixing of the ring 26 to the plate 18 is ensured by the same screw 20 for fixing the device 11 of the invention to the wall. The insertion of such a safety fixing system 24, for example every ten devices 11, prevents risks of the cable falling also in the case of fire inside a tunnel.

The invention claimed is:

1. A wall-fixing device of an elongated body, comprising:
a spacer provided with a cable clamp for supporting the elongated body in a suspended position on a wall,
   wherein said spacer has a structure comprising,
   a first base shaped as a plate adapted to be attached to said wall, said spacer being configured to be attached to said wall by having said spacer contact said wall with said first base only and by further having a screw couple said first base to said wall,
   a second base parallel to said first base, said cable clamp being coupled to said second base and having a longitudinal axis and an opening on a side parallel thereto, said cable clamp being shaped as a hook extending from said second base, and
   two arms extending outwardly of said first base and connecting said first base to said second base, said first and said second bases and said cable clamp being monolithically joined to one another, said two arms being parallel to one another and separated by an air gap extending from the first base to the second base,
   wherein a seat for receiving the screw coupling said spacer to said wall is defined in said first base between said two arms, said seat being shaped as an opening and having a longitudinal axis parallel to a longitudinal axis of said cable clamp, and
   wherein said two arms have opposing walls that extends diagonally with respect to said longitudinal axis of said seat, said longitudinal axis of said seat being positioned separate and distant form the longitudinal axis of the cable clamp.

2. The device according to claim 1, further comprising a second plate connecting said second base to said cable clamp, said second plate being provided with stiffening ribs.

3. The device according to claim 2, wherein one of said ribs extends along an entire corresponding arc portion of said cable clamp.

4. The device according to claim 1, further comprising a safety fixing system of said elongated body consisting of a wire made of a flexible metal material provided, at one end, with an openable collar which closes around the elongated body and, at an opposite end, with a fixing ring adapted to be engaged to said screw.

5. A wall-fixing device of an elongated body, comprising:
a spacer provided with a cable clamp for supporting the elongated body in a suspended position on a wall,
   wherein said spacer has a structure comprising,
   a first base shaped as a plate adapted to be attached to said wall, said spacer being configured to be attached to said wall by having said spacer contact said wall with said first base only and by further having a screw couple said first base to said wall,
   a second base parallel to said first base, said cable clamp being coupled to said second base and having a longitudinal axis and an opening on a side parallel thereto, said cable clamp being shaped as a hook extending from said second base, and
   two arms extending outwardly of said first base and connecting said first base to said second base, said first and said second bases and said cable clamp being integrally joined to one another, said two arms being paarallel to one another and separated by an air gap extending from the first base to the second base,
   wherein a seat for receiving the screw coupling said spacer to said wall is defined in said first base between said two arms, said seat being shaped as an opening and having a longitudinal axis parallel to a longitudinal axis of said cable clamp,
   wherein said two arm have opposing walls that extends diagonally with respect to said longitudinal axis of said seat, said longitudinal axis of said seat being positioned separate and distant from the loingitudinal axis of the cable clamp, and
   wherein each of said two arms has an opening and is tapered in a direction of said cable clamp.

6. The device according to claim 5,
wherein said cable clamp is provided with a lid,
wherein, when the lid is arranged to engage ends of said cable clamp, the lid is situated above the elongated body if said device is installed on a vertical wall, and wherein the lid is positioned to a side of the elongated body when the device is installed on a horizontal wall.

7. A wall-fixing device of an elongated body, comprising: a spacer provided with a cable clamp for supporting the elongated body in a suspended position on a wall, wherein said spacer has a structure comprising, a first base shaped as a plate adapted to be attached to said wall, a second base parallel to said first base, said cable clamp being coupled to said second base and having a longitudinal axis and an opening on a side parallel thereto, and two arms extending outwardly of said first base and connecting said frist base to said second base, said first and said second bases and said cable clamp being integrally joined to one another, wherein a seat for receiving a screw coupling said spacer to said wall is defined in said first base between said two arms, said seat being shaped as an opening and having a longitudinal axis parallel to a longitudinal axis of said cable clamp, further comprising a safety fixing system of said elongated body consisting of a wire made of a flexible metal provided, at one end, with an openable collar which closes around the elongated body and, at an opposite end, with a fixing ring adapted to be engaged to said screw, wherein said two arms have opposing walls that extends diagonally with respect to said longitudinal axis of said seat, said longitudinal axis of said seat being positioned separate and distant from the longitudinal axis of the cable clamp, and wherein said first base has a seat defined therein for housing said fixing ring of said wire.

* * * * *

UNITED STATES PATENT AND TRADEMARK OFFICE
CERTIFICATE OF CORRECTION

PATENT NO. : 10,707,665 B2  
APPLICATION NO. : 15/536161  
DATED : July 7, 2020  
INVENTOR(S) : Alberto Varale et al.

Page 1 of 1

It is certified that error appears in the above-identified patent and that said Letters Patent is hereby corrected as shown below:

On the Title Page

Foreign Application Priority Data Item (30):  
Replace --Dec. 2, 2014-- with --Dec. 19, 2014--.

Signed and Sealed this  
Third Day of November, 2020

Andrei Iancu  
*Director of the United States Patent and Trademark Office*